US011866851B2

(12) United States Patent
Nishigawa et al.

(10) Patent No.: US 11,866,851 B2
(45) Date of Patent: Jan. 9, 2024

(54) AQUEOUS LIQUID OF TREATMENT AGENT FOR CARBON FIBER PRECURSORS, AND CARBON FIBER PRECURSOR

(71) Applicant: TAKEMOTO YUSHI KABUSHIKI KAISHA, Aichi-ken (JP)

(72) Inventors: Takeshi Nishigawa, Gamagori (JP); Akihiro Doi, Gamagori (JP)

(73) Assignee: TAKEMOTO YUSHI KABUSHIKI KAISHA, Gamagori (JP)

( * ) Notice: Subject to any disclaimer, the term of this patent is extended or adjusted under 35 U.S.C. 154(b) by 0 days.

(21) Appl. No.: 17/603,133

(22) PCT Filed: Oct. 6, 2020

(86) PCT No.: PCT/JP2020/037805
§ 371 (c)(1),
(2) Date: Oct. 12, 2021

(87) PCT Pub. No.: WO2021/070796
PCT Pub. Date: Apr. 15, 2021

(65) Prior Publication Data
US 2022/0275539 A1   Sep. 1, 2022

(30) Foreign Application Priority Data
Oct. 7, 2019   (JP) .................................. 2019-184527

(51) Int. Cl.
*D01F 9/22*        (2006.01)
*C11D 1/722*       (2006.01)
*C01B 32/05*       (2017.01)
*D01F 8/08*        (2006.01)
*D06M 15/643*      (2006.01)
*D06M 15/647*      (2006.01)

(52) U.S. Cl.
CPC ................ *D01F 9/22* (2013.01); *C01B 32/05* (2017.08); *C11D 1/722* (2013.01); *D01F 8/08* (2013.01); *D06M 15/647* (2013.01); *D06M 15/6436* (2013.01)

(58) Field of Classification Search
CPC .. D06M 13/17; D06M 15/53; D06M 2101/28; D06M 2101/40; D01F 9/22
See application file for complete search history.

(56) References Cited

U.S. PATENT DOCUMENTS

| | | | |
|---|---|---|---|
| 5,571,442 | A | 11/1996 | Masaki et al. |
| 2013/0131386 | A1 | 5/2013 | Wang et al. |
| 2017/0284016 | A1 | 10/2017 | Aso et al. |
| 2019/0234014 | A1* | 8/2019 | Arakawa ................. C08L 83/06 |

FOREIGN PATENT DOCUMENTS

| | | |
|---|---|---|
| EP | 2905364 A1 | 8/2015 |
| JP | 2002371477 A | 12/2002 |
| JP | 2003201346 A | 7/2003 |
| JP | 3459305 B2 | 10/2003 |
| JP | 2005298689 A | 10/2005 |
| JP | 2007308615 A | 11/2007 |
| JP | 4311246 B2 | 8/2009 |
| JP | 2011099167 A | 5/2011 |
| JP | 2012046855 A | 3/2012 |
| JP | 2013177495 A | 9/2013 |
| JP | 2015094039 A | 5/2015 |
| JP | 2016056497 A | 4/2016 |
| KR | 102146230 B1 | 8/2020 |
| WO | 2017169632 A1 | 10/2017 |
| WO | 2018100788 A1 | 6/2018 |

OTHER PUBLICATIONS

"Secondary Alcohol Ethoxylates: Softanol ™." Secondary Alcohol Ethoxylates: SOFTANOL ™, https://www.shokubai.co.jp/en/products/detail/sofu.html. (Year: 2022).*
Saito, Yoshihiro, et al. "Effects of Molecular Weight Distribution of Nonionic Surfactants on Stability of O/W Emulsions." Journal of the American Oil Chemists' Society, vol. 67, No. 3, 1990, pp. 145-148., https://doi.org/10.1007/bf02539614. (Year: 1990).*
"The TSKgel/TOYOPERL general catalog 2016-2018" [online], p. 116-119, the Internet; https://separations.asia.tosohbioscience.com/litjp/productcat.
Nippon Shokubai Co., Ltd, "surfactant SOFTANOL" catalog Evidence.
The Tosoh Corp. Analyzing Center, "Analysis as of Oct. 13, 2020, The test report", report No. QK2010006.
The Tosoh Corp. Analyzing Center, "Analysis as of Oct. 14, 2020 The test report", report No. OK2010010.
Extended European Search Report for Application No. 20874526.5 dated Jun. 15, 2022, 7 pages.

* cited by examiner

Primary Examiner — Marla D McConnell
Assistant Examiner — Christine X Nisula
(74) Attorney, Agent, or Firm — CANTOR COLBURN LLP

(57) ABSTRACT

An aqueous liquid of a carbon fiber precursor treatment agent contains a carbon fiber precursor treatment agent and water, the carbon fiber precursor treatment agent containing an amino-modified silicone and a particular nonionic surfactant having a molecular weight distribution (Mw/Mn) of from 1.05 to 1.50. The amino-modified silicone may have a kinematic viscosity at 25° C. of 50 to 4,000 mm²/s. The carbon fiber precursor treatment agent is adhered to a carbon fiber precursor.

5 Claims, No Drawings

AQUEOUS LIQUID OF TREATMENT AGENT FOR CARBON FIBER PRECURSORS, AND CARBON FIBER PRECURSOR

TECHNICAL FIELD

The present invention relates to an aqueous liquid of a carbon fiber precursor treatment agent that has improved temporal stability and can improve the strength of carbon fibers, and a carbon fiber precursor obtained by applying such an aqueous liquid of a carbon fiber precursor treatment agent.

BACKGROUND ART

Generally, carbon fibers are widely used in the fields of building materials, transport equipment, and the like, for example, as carbon fiber composite materials in which the carbon fibers are combined with matrix resins, such as epoxy resins. Usually, carbon fibers are produced through the step of spinning, for example, acrylic fibers, as a carbon fiber precursor, the step of drawing the fibers, a flameproofing treatment step, and a carbonization treatment step. A carbon fiber precursor treatment agent may be used for the carbon fiber precursor in order to improve the bundling property of fibers and suppress agglutination or fusion between fibers in a process for producing carbon fibers.

Conventionally, the carbon fiber precursor treatment agents disclosed in Patent Documents 1 to 3 are known. Patent Document 1 discloses an amino-modified silicone oil agent composition containing a silicone oil agent and an emulsifier, the silicone oil agent including an amino-modified polysiloxane having a predetermined viscosity, and the emulsifier including a nonionic surfactant. Patent Document 2 discloses a synthetic fiber treatment oil agent containing a polycyclic aromatic nonionic emulsifier and an amino-modified silicone, the emulsifier having a predetermined chemical formula. Patent Document 3 discloses a silicone oil composition containing a silicone and a nonionic surfactant including an alkyl chain and a polyoxyalkylene chain.

PRIOR ART LITERATURE

Patent Literature

Patent Document 1: Japanese Patent No. 3459305
Patent Document 2: Japanese Patent No. 4311246
Patent Document 3: Japanese Laid-Open Patent Publication No. 2005-298689

SUMMARY OF THE INVENTION

Problems that the Invention is to Solve

However, a problem of the conventional carbon fiber precursor treatment agents is that when they are stored in the state of an aqueous liquid, the temporal stability decreases, and the strength of finally obtained carbon fibers decreases.

The object of the present invention is to provide an aqueous liquid of a carbon fiber precursor treatment agent that has improved temporal stability and can improve the strength of carbon fibers, and to provide a carbon fiber precursor.

Means for Solving the Problems

Then, the inventors of the present invention have studied in order to solve the problem, and as a result, found that an aqueous liquid of a carbon fiber precursor treatment agent in which in addition to an amino-modified silicone, a nonionic surfactant having a predetermined molecular weight distribution is used in combination is properly preferred.

In order to solve the problem and in accordance with one aspect of the present invention, an aqueous liquid of a carbon fiber precursor treatment agent is provides that includes a carbon fiber precursor treatment agent and water, the carbon fiber precursor treatment agent containing an amino-modified silicone and a nonionic surfactant having a molecular weight distribution (Mw/Mn) of 1.05 to 1.50.

In the aqueous liquid of the carbon fiber precursor treatment agent, the nonionic surfactant may be represented by the following Chemical Formula 1.

[Chemical Formula 1]

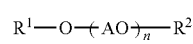

(In Chemical Formula 1,
$R^1$ is a straight chain hydrocarbon group having 8 to 18 carbon atoms, or a branched chain hydrocarbon group having 8 to 18 carbon atoms,
AO is an oxyalkylene group having 2 to 3 carbon atoms,
$R^2$ is a hydrogen atom or a hydrocarbon group having 1 to 4 carbon atoms, and
n is an integer of 1 to 60.)

In the aqueous liquid of the carbon fiber precursor treatment agent, the nonionic surfactant may include two or more nonionic surfactants that have different numbers of carbon atoms of $R^1$ in Chemical Formula 1.

In the aqueous liquid of the carbon fiber precursor treatment agent, the amino-modified silicone may have a kinematic viscosity at 25° C. of 50 to 4,000 mm²/s.

When the total content of the amino-modified silicone, the water, and the nonionic surfactant in the aqueous liquid of the carbon fiber precursor treatment agent is taken as 100 parts by mass, the amino-modified silicone and the nonionic surfactant are contained in total at a ratio of 20 to 50 parts by mass and the water is contained at a ratio of 50 to 80 parts by mass.

In the aqueous liquid of the carbon fiber precursor treatment agent, the mass ratio of the content of the amino-modified silicone with respect to the content of the nonionic surfactant may be 95/5 to 75/25.

Another aspect of the present invention provides a carbon fiber precursor to which the carbon fiber precursor treatment agent is adhered.

Effect of the Invention

The present invention succeeds in improving temporal stability and the strength of carbon fibers.

MODES FOR CARRYING OUT THE INVENTION

First Embodiment

A first embodiment that embodies an aqueous liquid of a carbon fiber precursor treatment agent according to the present invention (hereinafter referred to simply as aqueous liquid) will now be described. The aqueous liquid of the present embodiment contains, in addition to an amino-modified silicone, a nonionic surfactant having a predetermined molecular weight distribution as essential components.

The amino-modified silicone has a polysiloxane skeleton including repeats of (—Si—O—), and some of the alkyl side chains to its silicon atoms are modified with amino-modified groups. The amino-modified groups may be bonded to side chains of the silicone, which is the main chain, the ends, and both. Examples of the amino-modified group include an amino group and organic groups having an amino group. As the organic groups having an amino group, the following Chemical Formula 2 is illustrated.

[Chemical Formula 2]

(In Chemical Formula 2, $R^1$ and $R^2$ are each an alkylene group having 2 to 4 carbon atoms and may be the same or different, and z is an integer of 0 or 1.)

Specific examples of amino-modified silicones having the amino-modified group of Chemical Formula 2 include dimethylsiloxane-methyl(aminopropyl)siloxane copolymers (aminopropyl dimethicone) and aminoethylaminopropylmethylsiloxane-dimethylsiloxane copolymers (amodimethicone).

The lower limit of the kinematic viscosity at 25° C. of the amino-modified silicone is not particularly limited but is preferably 50 mm²/s or more. When the lower limit of the kinematic viscosity is 50 mm²/s or more, the strength of carbon fibers is further improved. The upper limit of the kinematic viscosity at 25° C. of the amino-modified silicone is not particularly limited but is preferably 4,000 mm²/s or less. When the upper limit of the kinematic viscosity is 4,000 mm²/s or less, the temporal stability of the aqueous liquid is further improved. For the kinematic viscosity when two or more amino-modified silicones are used, the actual measured value of a mixture of the amino-modified silicones used is applied.

The nonionic surfactant has a molecular weight distribution (Mw/Mn) in the range of 1.05 to 1.50. The molecular weight distribution of the nonionic surfactant is obtained by the GPC method using the mixture of nonionic surfactants included in the aqueous liquid as a test sample. For the nonionic surfactant included in the aqueous liquid, one in a broad state having the predetermined molecular weight distribution, rather than a monodisperse one, is used to improve the temporal stability of the aqueous liquid.

The type of the nonionic surfactant is not particularly limited as long as the requirement of the molecular weight distribution described above is satisfied. Examples of the type include a compound obtained by adding an alkylene oxide to an alcohol or a carboxylic acid, an ester compound of a carboxylic acid and a polyhydric alcohol, and an ether-ester compound obtained by adding an alkylene oxide to an ester compound of a carboxylic acid and a polyhydric alcohol.

Specific examples of the alcohol used as a raw material of the nonionic surfactant include (1) straight chain alkyl alcohols, such as methanol, ethanol, propanol, butanol, pentanol, hexanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, pentacosanol, hexacosanol, heptacosanol, octacosanol, nonacosanol, and triacontanol, (2) branched alkyl alcohols, such as isopropanol, isobutanol, isohexanol, 2-ethylhexanol, isononanol, isodecanol, isotridecanol, isotetradecanol, isotriacontanol, isohexadecanol, isoheptadecanol, isooctadecanol, isononadecanol, isoeicosanol, isoheneicosanol, isododocosanol, isotricosanol, isotetracosanol, isopentacosanol, isohexacosanol, isoheptacosanol, isooctacosanol, isononacosanol, and isopentadecanol, (3) straight chain alkenyl alcohols, such as tetradecenol, hexadecenol, heptadecenol, octadecenol, and nonadecenol, (4) branched alkenyl alcohols, such as isohexadecenol and isooctadecenol, (5) cyclic alkyl alcohols, such as cyclopentanol and cyclohexanol, and (6) aromatic alcohols, such as phenol, benzyl alcohol, monostyrenated phenol, distyrenated phenol, and tristyrenated phenol.

Specific examples of the carboxylic acid used as a raw material of the nonionic surfactant include (7) straight chain alkyl carboxylic acids, such as octylic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, and docosanoic acid, (8) branched alkyl carboxylic acids, such as 2-ethylhexanoic acid, isododecanoic acid, isotridecanoic acid, isotetradecanoic acid, isohexadecanoic acid, and isooctadecanoic acid, (9) straight chain alkenyl carboxylic acids, such as octadecene acid, octadecadienoic acid, and octadecatrienoic acid, and (10) aromatic carboxylic acids, such as benzoic acid. An alcohol or carboxylic acid as raw material may be used, and two or more alcohols or carboxylic acids may be used in combination. Of these, two or more alcohols or carboxylic acids are preferably used in combination from the viewpoint of making the molecular weight distribution broad and further improving the temporal stability of the aqueous liquid.

Specific examples of the alkylene oxide used as a raw material of the nonionic surfactant include ethylene oxide and propylene oxide. The addition mole number of the alkylene oxide is appropriately set but is preferably 0.1 to 60 mol, more preferably 1 to 40 mol, and further preferably 2 to 30 mol. The addition mole number of the alkylene oxide represents the mole number of the alkylene oxide per 1 mol of the alcohol or the carboxylic acid in the charged raw materials. When the addition mole number of the alkylene oxide is 0.1 mol or more, it is easy to adjust the molecular weight distribution to be broad. On the other hand, when the addition mole number of the alkylene oxide is 60 mol or less, the strength of carbon fibers is further improved.

Specific examples of the polyhydric alcohol used as a raw material of the nonionic surfactant include ethylene glycol, propylene glycol, 1,3-propanediol, 1,2-butanediol, 1,3-butanediol, 1,4-butanediol, 1,4-butanediol, 2-methyl-1,2-propanediol, 1,5-pentanediol, 1,6-hexanediol, 2,5-hexanediol, 2-methyl-2,4-pentanediol, 2,3-dimethyl-2,3-butanediol, glycerin, 2-methyl-2-hydroxymethyl-1,3-propanediol, 2-ethyl-2-hydroxymethyl-1,3-propanediol, trimethylolpropane, sorbitan, pentaerythritol, and sorbitol.

An alkylene oxide or polyhydric alcohol as a raw material may be used, and two or more alkylene oxides or polyhydric alcohols may be used in combination.

For adjusting the molecular weight distribution of the nonionic surfactant, a nonionic surfactant having a broad molecular weight distribution is obtained by using two or more nonionic surfactants. Two or more nonionic surfactants may be mixed to obtain the nonionic surfactant having a broad molecular weight distribution. Alternatively, a nonionic surfactant having a broad molecular weight distribution is obtained by using raw materials such as two or more alcohols or carboxylic acids, and varying reaction conditions, for example, making the amount of the catalyst smaller than the amount usually used.

Among these nonionic surfactants, a compound represented by the following Chemical Formula 3 is preferably included. By using such a compound, the temporal stability of the aqueous liquid is further improved.

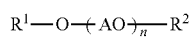

[Chemical Formula 3]

(In Chemical Formula 3,
$R^1$ is a straight chain hydrocarbon group having 8 to 18 carbon atoms or a branched chain hydrocarbon group having 8 to 18 carbon atoms,
AO is an oxyalkylene group having 2 to 3 carbon atoms,
$R^2$ is a hydrogen atom or a hydrocarbon group having 1 to 4 carbon atoms, and
n is an integer of 1 to 60.)

Further, the nonionic surfactant more preferably includes two or more nonionic surfactants that have different numbers of carbon atoms of $R^1$ in Chemical Formula 3. By using such a nonionic surfactant, it is easy to adjust the molecular weight distribution to be broad. Thus, the temporal stability of the aqueous liquid is further improved.

In the aqueous liquid, the content of the amino-modified silicone, the water, and the nonionic surfactant is not particularly limited. When the total content of the amino-modified silicone, the water, and the nonionic surfactant in the aqueous liquid is taken as 100 parts by mass, the amino-modified silicone and the nonionic surfactant are contained in total at a ratio of 20 to 50 parts by mass and the water is contained at a ratio of 50 to 80 parts by mass. By defining such blending ratios, the temporal stability of the aqueous liquid is further improved.

In the aqueous liquid, the mass ratio of the content of the amino-modified silicone with respect to the nonionic surfactant is not particularly limited. The mass ratio of the content of the amino-modified silicone with respect to the nonionic surfactant is preferably 95/5 to 75/25. By defining such a blending ratio, the temporal stability of the aqueous liquid is further improved.

Second Embodiment

Next, a second embodiment that embodies a carbon fiber precursor according to the present invention will be described. The carbon fiber treatment agent described in the first embodiment is adhered to the carbon fiber precursor of the present embodiment.

In a method for producing carbon fibers using the carbon fiber precursor of the present embodiment, for example, the aqueous liquid of the first embodiment is adhered to the raw material fibers for the carbon fiber precursor to obtain the carbon fiber precursor, and then drying treatment is performed as needed, and then a yarn making step is performed. Next, the flameproofing treatment step of converting the carbon fiber precursor produced in the yarn making step into flameproofed fibers in an oxidizing atmosphere at 200° C. to 300° C., preferably 230° C. to 270° C., and the carbonization treatment step of further carbonizing the flameproofed fibers in an inert atmosphere at 300° C. to 2,000° C., preferably 300° C. to 1,300° C., are performed.

The yarn making step is the step of making yarns from the carbon fiber precursor obtained by adhering the aqueous liquid of the first embodiment to the raw material fibers for the carbon fiber precursor, and includes an adhesion treatment step and a drawing step.

The adhesion treatment step is the step of spinning the raw material fibers for the carbon fiber precursor and then adhering the aqueous liquid. In other words, the aqueous liquid is adhered to the raw material fibers for the carbon fiber precursor in the adhesion treatment step. These raw material fibers for the carbon fiber precursor are drawn immediately after spinning, and the high ratio drawing after the adhesion treatment step is particularly referred to as a "drawing step. The drawing step may be a wet hot drawing method using high temperature steam, or a dry hot drawing method using a hot roller.

Examples of the raw material fibers for the carbon fiber precursor include acrylic fibers. The acrylic fibers are preferably composed of fibers including, as the main component, polyacrylonitrile obtained by copolymerizing at least 90% by mol or more of acrylonitrile and 10% by mol or less of a flameproofing-promoting component. As the flameproofing-promoting component, for example, a vinyl group-containing compound copolymerizable with acrylonitrile can be preferably used. The single fiber fineness of the carbon fiber precursor is not particularly limited but is preferably 0.1 to 2.0 dTex from the viewpoint of the balance of performance and production cost. The number of single fibers constituting a fiber bundle of the carbon fiber precursor is not particularly limited either but is preferably 1,000 to 96,000 from the viewpoint of the balance of performance and production cost.

The aqueous liquid may be adhered to the raw material fibers for the carbon fiber precursor at any stage of the yarn making step but is preferably adhered once before the drawing step. The aqueous liquid may be adhered at any stage as long as it is a stage before the drawing step. For example, the aqueous liquid may be adhered immediately after spinning. Further, the aqueous liquid may be adhered again at any stage after the drawing step. For example, the aqueous liquid may be adhered again immediately after the drawing step, at a winding stage, or immediately before the flameproofing treatment step. The number of adhesions during the yarn making step is not particularly limited. After the aqueous liquid is adhered to the carbon fiber precursor, drying treatment may be performed as needed. After the adhesion treatment step, the water derived from the aqueous liquid is evaporated, and the carbon fiber treatment agent adheres to the carbon fibers.

The proportion of the carbon fiber precursor treatment agent of the first embodiment adhered to the carbon fiber precursor is not particularly limited, but the carbon fiber precursor treatment agent (not including the solvent) is preferably adhered so as to be 0.1% to 2% by mass, more preferably 0.3% to 1.2% by mass, based on the carbon fiber precursor. The effect of the present invention is further improved by such a configuration. As the method for adhering the aqueous liquid of the first embodiment, known methods can be applied, and examples thereof include a spray feeding method, an immersion feeding method, a roller feeding method, and a guide feeding method using a measuring pump.

Actions and effects of the aqueous liquid and carbon fiber precursor of the present embodiments will now be described.

(1) In the present embodiments, when an aqueous liquid including an amino-modified silicone and water is prepared, a nonionic surfactant having a predetermined molecular weight distribution is used. Therefore, the temporal stability of the aqueous liquid can be improved. Particularly, the temporal stability at high temperature in summer is improved. In addition, the strength of carbon fibers synthesized with a carbon fiber precursor obtained by applying such an aqueous liquid is improved.

The embodiments may be carried out by making variations as follows. The embodiments and the following variations may be carried out by being combined with each other in a technically consistent range.

To the aqueous liquid of the present embodiment, a component to be usually used in a carbon fiber precursor treatment agent such as a stabilizer, an antistatic agent, a binding agent, an antioxidant, a preservative, an antimicrobial agent, a pH adjusting agent, an ultraviolet absorbing agent, other surfactants, and other silicones for the quality maintenance of the aqueous liquid may be further blended within ranges that do not inhibit the effect of the present invention.

EXAMPLES

Examples will now be given below to describe the features and effects of the present invention more specifically, but the present invention is not limited to these examples. In the following description of working examples and comparative examples, parts means parts by mass and % means % by mass.

Experimental Part 1 (Preparation of Aqueous Liquids of Carbon Fiber Precursor Treatment Agents)

Method for Producing Nonionic Surfactant (N-1)

20 parts of decanol, 50 parts of undecanol, and 30 parts of dodecanol as raw material alcohols constituting $R^1$ in the Chemical Formula 3 were added into an autoclave, and further 0.05 parts of potassium hydroxide was added. The atmosphere was replaced by nitrogen gas. 76 parts of ethylene oxide was gradually added at 150° C. for the etherification reaction. The potassium hydroxide was adsorbed followed by filtration to synthesize a nonionic surfactant (N-1).

The structures ($R^1$, AO, and $R^2$) constituting the nonionic surfactant (N-1) represented by Chemical Formula 3 are respectively shown in the "Number of carbon atoms of alkyl group of $R^1$ in Chemical Formula 3" column, the "Mixing ratio of raw materials in $R^1$" column, the "AO in Chemical Formula 3" column, and the "Type of $R^2$ in Formula 3" column in Table 1.

Method for Producing Nonionic Surfactants (N-2) to (N-11)

Nonionic surfactants (N-2) to (N-11) were synthesized by the same formulation as above, based on the "Number of carbon atoms of alkyl group of $R^1$ in Formula 3" column, the "Mixing ratio of raw materials in $R^1$" column, the "AO in Formula 3" column, and the "Type of $R^2$ in Formula 3" column in the following Table 1.

The structures ($R^1$, AO, and $R^2$) constituting the nonionic surfactants (N-2) to (N-11) represented by Formula 3 are respectively shown in the "Number of carbon atoms of alkyl group of $R^1$ in Formula 3" column, the "Mixing ratio of raw materials in $R^1$" column, the "AO in Formula 3" column, and the "Type of $R^2$ in Formula 3" column in Table 1.

Example 1

30 parts of (A) an amino-modified silicone (Si-1), 5 parts of (B) the nonionic surfactant (N-4), and 65 parts of ion-exchanged water were stirred well, and then emulsified using a homogenizer, to prepare an aqueous liquid of a carbon fiber precursor treatment agent having a solid concentration of 35% in Example 1.

Examples 2 to 16 and Comparative Examples 1 to 4

Aqueous liquids of carbon fiber precursor treatment agents in Examples 2 to 16 and Comparative Examples 1 to 4 were prepared by the same formulation as Example 1, based on the amounts of the (A) amino-modified silicone, the (B) nonionic surfactant, and water blended as described in the "Parts by mass" columns in Table 3.

The structures and kinematic viscosity of the silicones (Si-1) to (Si-5), (rSi-6), and (rSi-7) used in the Examples and the Comparative Examples are shown in the "Silicone structure" column and the "Kinematic viscosity" column in Table 2.

The types of the (A) amino-modified silicones and the (B) nonionic surfactants used in the Examples and the Comparative Examples are shown in the "Type" columns of the components in Table 3. The amounts of the (A) amino-modified silicones, the (B) nonionic surfactants, and water blended in the aqueous liquids are shown in the "Parts by mass" columns of the components in Table 3. The total masses of the (A) amino-modified silicones and the (B) nonionic surfactants and the mass ratios of the content of the (A) silicones with respect to the content of the (B) nonionic surfactants in the aqueous liquids are respectively shown in the "Total mass of A component and B component" column and the "A component/B component mass ratio" column in Table 3.

Method for Measuring Molecular Weight Distribution

The molecular weight distributions of the nonionic surfactants were obtained by the method shown below.

First, 0.02 g of each of the mixtures of nonionic surfactants included in the aqueous liquids of the Examples and the Comparative Examples was taken in a vial, and 30 mL of tetrahydrofuran (THF) was added for dilution to obtain a sample solution. For 1 mL of the sample solution, a syringe equipped with a GPC filtration filter was used to remove foreign materials and thus prepare a sample solution into a GPC sample bottle. GPC was measured using HLC-8320GPC manufactured by Tosoh Corporation equipped with TSKgel SuperH-RC as a reference column and TSK-guardcolumn SuperH-L, TSKgel SuperH4000, TSKgel SuperH3000, and TSKgel SuperH2000 as measurement columns. For the number average molecular weight (=Mn) and the mass average molecular weight (=Mw), a calibration curve was made using TSKgel standard polystyrene as a standard sample, and Mn and Mw of each of the mixtures of nonionic surfactants included in the aqueous liquids of the Examples and the Comparative Examples were obtained. The molecular weight distribution (=Mw/Mn) was calculated using the numerical values. The results of the molecular weight distributions are shown in the "Molecular weight distribution" column in Table 3.

TABLE 1

| Category | Number of carbon atoms of alkyl group of $R^1$ in Chemical Formula 3 | Mixing ratio of raw materials in $R^1$ | AO in Chemical Formula 3 Addition mole number of oxyethylene group | AO in Chemical Formula 3 Addition mole number of oxypropylene group | Type of $R^2$ in Chemical Formula 3 |
|---|---|---|---|---|---|
| N-1 | C10 | 20 | 3 | 0 | H |
|  | C11 | 50 |  |  |  |
|  | C12 | 30 |  |  |  |
| N-2 | C10 | 25 | 9 | 0 | H |
|  | C11 | 50 |  |  |  |
|  | C12 | 25 |  |  |  |
| N-3 | C10 | 25 | 12 | 0 | H |
|  | C11 | 50 |  |  |  |
|  | C12 | 25 |  |  |  |
| N-4 | C12 | 50 | 5 | 0 | H |
|  | C13 | 50 |  |  |  |
| N-5 | C12 | 60 | 10 | 0 | H |
|  | C13 | 40 |  |  |  |
| N-6 | C12 | 75 | 25 | 0 | H |
|  | C14 | 25 |  |  |  |
| N-7 | C14 | 50 | 15 | 10 | H |
|  | C15 | 50 |  |  |  |
| N-8 | C14 | 50 | 40 | 10 | H |
|  | C15 | 50 |  |  |  |
| N-9 | C16 | 15 | 5 | 0 | $C_2H_5$ |
|  | C18 | 85 |  |  |  |
| N-10 | C8 | 100 | 7 | 0 | H |
| N-11 | C4 | 100 | 5 | 5 | H |

The details of the nonionic surfactants of N-1 to N-11 described in the category column in Table 1 are as follows.

N-1: a mixture of polyoxyethylene (n=3: the addition mole of ethylene oxide is represented; the same applies hereinafter) decyl ether, polyoxyethylene (n=3) undecyl ether, and polyoxyethylene (n=3) dodecyl ether N-2: a mixture of polyoxyethylene (n=9) decyl ether, polyoxyethylene (n=9) undecyl ether, and polyoxyethylene (n=9) dodecyl ether N-3: a mixture of polyoxyethylene (n=12) decyl ether, polyoxyethylene (n=12) undecyl ether, and polyoxyethylene (n=12) dodecyl ether N-4: a mixture of polyoxyethylene (n=5) dodecyl ether and polyoxyethylene (n=5) tridecyl ether N-5: a mixture of polyoxyethylene (n=10) dodecyl ether and polyoxyethylene (n=10) tridecyl ether N-6: a mixture of polyoxyethylene (n=25) dodecyl ether and polyoxyethylene (n=25) tetradecyl ether N-7: a mixture of polyoxyethylene (n=15) polyoxypropylene (m=10: the addition mole of propylene oxide is represented; the same applies hereinafter) tetradecyl ether and polyoxyethylene (n=15) polyoxypropylene (m=10) pentadecyl ether N-8: a mixture of polyoxyethylene (n=40) polyoxypropylene (m=10) tetradecyl ether and polyoxyethylene (n=40) polyoxypropylene (m=10) pentadecyl ether N-9: a mixture of polyoxyethylene (n=5) hexadecyl ethyl ether and polyoxyethylene (n=5) octadecyl ethyl ether N-10: polyoxyethylene (n=7) octyl ether N-11: polyoxyethylene (n=5) polyoxypropylene (m=5) butyl ether

TABLE 2

| Category | Silicone structure | Kinematic viscosity ($mm^2/s$) |
|---|---|---|
| Si-1 | Amino-modified silicone | 90 |
| Si-2 | Amino-modified silicone | 650 |
| Si-3 | Amino-modified silicone | 3500 |
| Si-4 | Amino-modified silicone | 7000 |
| Si-5 | Si-1/Si-3 = 83.3/16.7 (Mass ratio) | 660 |
| rSi-6 | Polyether-modified silicone | 300 |
| rSi-7 | Dimethyl silicone | 10 |

TABLE 3

| | Aqueous liquid of carbon fiber precursor treatment agent | | | | | | | | | | |
|---|---|---|---|---|---|---|---|---|---|---|---|
| | (A) Silicone | | (B) Nonionic surfactant | | | Water | | Total mass of A component and B component | A component/B component mass ratio | Evaluation of aqueous liquid Temporal stability | Evaluation of carbon fibers Strength |
| Category | Type | Parts by mass | Type | Parts by mass | Molecular weight distribution (Mw/Mn) | Parts by mass | Total | | | | |
| Example 1 | Si-1 | 30 | N-4 | 5 | 1.331 | 65 | 100 | 35 | 84:14 | ∞ | ○ |
| Example 2 | Si-3 | 30 | N-1 | 1.5 | 1.326 | 67 | 100 | 33 | 84:14 | ∞ | ○ |
| | | | N-8 | 1.5 | | | | | | | |
| Example 3 | Si-1 | 20 | N-1 | 1 | 1.253 | 78 | 100 | 22 | 91:9 | ∞ | ○ |
| | | | N-3 | 1 | | | | | | | |
| Example 4 | Si-1 | 30 | N-4 | 1 | 1.168 | 67 | 100 | 33 | 91:9 | ∞ | ○ |
| | | | N-5 | 1 | | | | | | | |
| | | | N-6 | 1 | | | | | | | |
| Example 5 | Si-2 | 30 | N-9 | 2 | 1.155 | 68 | 100 | 32 | 94:6 | ∞ | ○ |
| Example 6 | Si-2 | 30 | N-2 | 1.5 | 1.109 | 67 | 100 | 33 | 91:9 | ∞ | ○ |
| | | | N-3 | 1.5 | | | | | | | |
| Example 7 | Si-5 | 24 | N-2 | 3 | 1.098 | 72 | 100 | 27 | 89:11 | ∞ | ○ |
| | rSi-7 | 1 | | | | | | | | | |
| Example 8 | Si-1 | 30 | N-7 | 6 | 1.087 | 64 | 100 | 36 | 83:17 | ∞ | ○ |
| Example 9 | Si-2 | 28 | N-6 | 3 | 1.081 | 67 | 100 | 31 | 90:10 | ∞ | ○ |
| | rSi-6 | 2 | | | | | | | | | |
| Example 10 | Si-1 | 30 | N-8 | 3 | 1.062 | 67 | 100 | 33 | 91:9 | ∞ | ○ |
| Example 11 | Si-1 | 35 | N-1 | 2.5 | 1.161 | 55 | 100 | 45 | 78:22 | ∞ | ○ |
| | | | N-4 | 2.5 | | | | | | | |
| | | | N-5 | 2.5 | | | | | | | |
| | | | N-6 | 2.5 | | | | | | | |
| Example 12 | Si-1 | 30 | N-10 | 7 | 1.210 | 63 | 100 | 37 | 81:19 | ○ | ○ |
| Example 13 | Si-1 | 30 | N-11 | 3 | 1.169 | 67 | 100 | 33 | 91:9 | ○ | ○ |
| Example 14 | Si-4 | 30 | N-1 | 3 | 1.326 | 64 | 100 | 36 | 83:17 | ○ | ○ |
| | | | N-8 | 3 | | | | | | | |
| Example 15 | Si-1 | 30 | N-4 | 1 | 1.331 | 69 | 100 | 31 | 97:3 | ○ | ○ |
| Example 16 | Si-1 | 60 | N-4 | 2 | 1.168 | 34 | 100 | 66 | 91:9 | ○ | ○ |
| | | | N-5 | 2 | | | | | | | |
| | | | N-6 | 2 | | | | | | | |
| Comparative Example 1 | Si-1 | 30 | N-1 | 3 | 1.037 | 67 | 100 | 33 | 91:9 | x | — |
| Comparative Example 2 | Si-1 | 30 | N-3 | 6 | 1.034 | 64 | 100 | 36 | 83:17 | x | — |
| Comparative Example 3 | rSi-7 | 30 | N-6 | 3 | 1.081 | 67 | 100 | — | — | ∞ | x |
| Comparative Example 4 | rSi-6 | 12 | N-2 | 28 | 1.098 | 60 | 100 | — | — | ∞ | x |

Experimental Part 2 (Production of Carbon Fiber Precursors and Carbon Fibers)

Carbon fiber precursors and carbon fibers were produced using the aqueous liquids of the carbon fiber precursor treatment agents prepared in Experimental Part 1.

A copolymer including 95% of acrylonitrile, 3.5% of methyl acrylate, and 1.5% of methacrylic acid and having a limiting viscosity of 1.80 was dissolved in dimethylacetamide (DMAC) to make a dope having a polymer concentration of 21.0%, and a viscosity of 500 P at 60° C. The dope was discharged into a coagulation bath of a 70% aqueous solution of DMAC maintained at a spinning bath temperature of 35° C. from a spinneret having a hole diameter (inner diameter) of 0.075 mm and a hole number of 12,000 at a draft ratio of 0.8.

The coagulated yarns were drawn 5 times simultaneously with solvent removal in a water-washing tank to make acrylic fiber strands in a water-swelled state. Each 4% ion-exchanged water solution obtained by further diluting each of the aqueous liquids of the carbon fiber precursor treatment agents prepared in Experimental Part 1 was fed to the fiber strands by an immersion method so that the amount of adhering solids in the carbon fiber precursor treatment agent was 1% (not including the solvent). Then, these acrylic fiber strands were subjected to drying and densification treatment by a heating roller at 130° C., further subjected to 1.7 times drawing between heating rollers at 170° C., and then wound on spools to obtain a carbon fiber precursor. Yarns were unwound from this carbon fiber precursor, subjected to flameproofing treatment in a flameproofing furnace having a temperature gradient of 230° C. to 270° C. under an air atmosphere for 1 hour, then continuously fired in a carbonization furnace having a temperature gradient of 300° C. to 1,300° C. under a nitrogen atmosphere for conversion into carbon fibers, and then wound on spools.

The temporal stability of the aqueous liquids of the carbon fiber precursor treatment agents and the strength of the carbon fibers were evaluated as shown below.

Experimental Part 3 (Evaluation)

Evaluation of Emulsification Stability 100 mL of each of the aqueous liquids of the carbon fiber precursor treatment agents was stored in a transparent closed container and allowed to stand at 40° C. for 3 days, and then the container was shaken 10 times, and the aqueous liquid was allowed to stand at 40° C. for 3 days again. The appearance after the standing was visually observed. The treatment agent after the storage was further diluted with ion-exchanged water so as to include 5% of solids, and the appearance after the dilution was visually observed. Evaluation was performed according to the following criteria, and the results are shown in the "Temporal stability" column in Table 3.

Evaluation Criteria of Emulsification Stability

○○ (excellent): Separation and precipitation were hardly seen, and the appearance was uniform. After the dilution, good emulsifying properties were maintained.

○ (good): Creaming and separation were slightly seen, but the emulsifying properties were good and at a practically unproblematic level. After the dilution, good emulsifying properties were maintained.

x (poor): Clear creaming and separation were seen. Alternatively, precipitation or separation occurred after the dilution.

Evaluation of Carbon Fiber Strength

The strength of the obtained carbon fibers was measured according to JIS R 7606 (corresponding international standard ISO 11566: 1996) and evaluated according to the following criteria. The results are shown in the "Strength" column in Table 3.

Evaluation Criteria of Carbon Fiber Strength

○ (excellent): 3.3 GPa or more.
x (poor): Less than 3.3 GPa.
-: Not evaluated because of poor stability.

As is also clear from the results in Table 3, according to the present invention, the effect of being able to improve the temporal stability of the aqueous liquid of the carbon fiber precursor treatment agent and being able to improve the strength of carbon fibers was shown.

The invention claimed is:

1. An aqueous liquid of a carbon fiber precursor treatment agent comprising a carbon fiber precursor treatment agent and water, wherein the carbon fiber precursor treatment agent contains an amino-modified silicone and a nonionic surfactant mixture having a molecular weight distribution (Mw/Mn) of 1.087 to 1.50, the nonionic surfactant mixture includes two or more nonionic surfactants that are represented by the following Chemical Formula 1 and have different numbers of carbon atoms of $R^1$ in Chemical Formula 1

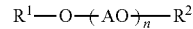

wherein
$R^1$ is a straight chain hydrocarbon group having 8 to 18 carbon atoms or a branched chain hydrocarbon group having 8 to 18 carbon atoms,
AO is an oxyalkylene group having 2 to 3 carbon atoms,
$R^2$ is a hydrogen atom or a hydrocarbon group having 1 to 4 carbon atoms, and
n is an integer of 1 to 60;
with the proviso that when the sum of the amounts of the amino-modified silicone, the nonionic surfactant mixture, and the water contained in the aqueous liquid is taken as 100 parts by mass, the aqueous liquid contains the amino-modified silicone at a ratio of 20 to 60 parts by mass and the nonionic surfactant mixture at a ratio of 1 to 10 parts by mass.

2. The aqueous liquid of the carbon fiber precursor treatment agent according to claim 1, wherein the amino-modified silicone has a kinematic viscosity at 25° C. of 50 to 4,000 mm²/s.

3. The aqueous liquid of the carbon fiber precursor treatment agent according to claim 1, wherein when the total content of the amino-modified silicone, the water, and the nonionic surfactant mixture in the aqueous liquid is taken as 100 parts by mass, the amino-modified silicone and the nonionic surfactant mixture are contained in total at a ratio of 20 to 50 parts by mass and the water is contained at a ratio of 50 to 80 parts by mass.

4. The aqueous liquid of the carbon fiber precursor treatment agent according to claim 1, wherein the mass ratio of the content of the amino-modified silicone with respect to the nonionic surfactant mixture is 95/5 to 75/25.

5. A carbon fiber precursor to which the carbon fiber precursor treatment agent according to claim 1 is adhered.

* * * * *